United States Patent
Berceanu et al.

(10) Patent No.: US 6,910,877 B2
(45) Date of Patent: Jun. 28, 2005

(54) ANTI-DROOL SPRUE GATED CROSS OVER NOZZLE

(75) Inventors: Mihai Berceanu, Thornhill (CA); Gary Fong, Markham (CA)

(73) Assignee: Stackteck Systems Limited, Brampton (CA)

( * ) Notice: Subject to any disclaimer, the term of this patent is extended or adjusted under 35 U.S.C. 154(b) by 209 days.

(21) Appl. No.: 10/366,284

(22) Filed: Feb. 13, 2003

(65) Prior Publication Data

US 2004/0142064 A1 Jul. 22, 2004

(30) Foreign Application Priority Data

Jan. 17, 2003 (CA) .............................................. 2416895

(51) Int. Cl.$^7$ .............................................. B29C 45/74
(52) U.S. Cl. ............. 425/547; 264/328.11; 264/328.15; 425/549; 425/567
(58) Field of Search ................................ 425/567, 549, 425/547, 570; 264/328.14, 328.15, 328.11

(56) References Cited

U.S. PATENT DOCUMENTS 2,529,146 A * 11/1950 Feitl ............................ 425/549
2,808,627 A * 10/1957 Willbald ...................... 425/567
6,454,558 B1 * 9/2002 Gellert ........................ 425/567

* cited by examiner

*Primary Examiner*—Tim Heitbrink
(74) *Attorney, Agent, or Firm*—R. Lewis Gable; Cowan, Liebowitz & Latman, P.C.

(57) ABSTRACT

According to the present invention a coding plate is interspersed between first and second respective inlet and outlet cross over nozzle parts. The cooling plate engages ends of the cross over nozzles during mould filling and provides a melt transfer passage therebetween. Once the mould is filled, the cooling plate acts to dissipate heat from the melt transfer passage thereby promoting solidification of melt therein. Accordingly melt solidification in the sprue is assured with more certainty than prior art designs enabling relatively fax mould cycling with minimal risk of drool.

10 Claims, 3 Drawing Sheets

ANTI-DROOL SPRUE GATED CROSS OVER NOZZLE

FIELD OF THE INVENTION

This invention relates generally to mould distribution arrangements for injection moulding apparatus. More particularly, this invention relates to cross over nozzle arrangements for multi-level stack moulds. Even more particularly, this invention relates to such cross over nozzle arrangements of a sprue gated design.

BACKGROUND OF THE INVENTION

In injection moulding apparatus utilizing a stack mould design, a melt transfer system is required which transfers melt across mould levels yet which is separable to enable mould separation. The component of the melt transfer system which effects separation is referred to as a "cross over nozzle".

In order to be effective, a cross over nozzle is provided with some means for blocking melt flow upon separation. Prior art systems include a valve gated design such as described in U.S. Pat. No. 4,212,626, a hot probe design such as described in U.S. Pat. No. 4,891,001 and a valveless melt transfer system such as described in U.S. Pat. No. 5,458,843. Each such system has particular benefits for certain types of application. Each however typically drools or leaks in one way or another.

The valve gated design utilizes a pair of nozzles which are pressed up one against the other when the mould is closed with respective nozzle orifices in registry. Each nozzle orifice has a pin which can be advanced to block its respective orifice or retracted to unblock the orifice and permit melt flow. A disadvantage with this arrangement is that it is mechanically complex. A positive driving force is required for the pin, which can be mechanical, pneumatic or hydraulic. The driving mechanisms typically require a considerable amount of space and accordingly such an arrangement may not be useable in some applications due to space constraints. There is also typically some stringing at the gate with such an arrangement. As the two pins open and close in a hot resin environment, hot resin may be trapped between the two pins causing a string to form when the mould is opened.

The valveless melt transfer design includes an expansive chamber which captures melt during mould opening. This is an effective system which requires minimal shut height yet still causes some angel hair stringing.

The hot probe design basically utilizes a heated nozzle tip to selectively allow the resin to solidify and block the nozzle or melt to free the nozzle. As it lacks a valve pin it has a tendency to drool heavily yet has the advantage of being compact and accordingly suited to an arrangement where space is limited. The hot probe design has better control at its "front" where its cooling is better controllable. The hot probe and valveless designs are referred to as being "sprue gated" as opposed to "valve gated" in view of having a sprue but no valve.

It is an object of the present invention to provide a sprue gated design without the disadvantages of being prone to heavy drooling.

SUMMARY OF THE INVENTION

According to the present invention a cooling plate is interspersed between melt delivering and melt receiving cross over nozzle parts. The cooling plate engages ends of the cross over nozzles during mould filling and provides a melt transfer passage therebetween. Once the mould is filled, the cooling plate acts to dissipate heat from the melt transfer passage thereby promoting solidification of melt therein. Accordingly melt solidification in the sprue is assured with more certainty than prior art designs enabling relatively fast mould cycling with minimal risk of drool.

More particularly, an anti-drool cross over nozzle arrangement for a sprue gated melt transfer system is provided which has a first nozzle member having a melt outlet end with a melt outlet for discharging melt and a second nozzle member having a melt inlet end with a melt inlet for receiving melt. A cooling plate is mounted between the first and second nozzles. The cooling plate has first and second receptacles respectively for registering with and receiving the melt outlet end and the melt inlet end during a mould closed stage of an injection moulding cycle. The cooling plate has a melt transfer passage extending between the first and second receptacles for providing fluid communication between the melt inlet and the melt outlet during the mould closed stage.

The cooling plate may be carried by either the stationary or moving side of the mould, being attached thereto by a cooling plate attachment assembly. The attachment assembly may react to movement of an injection moulding assembly incorporating the melt transfer system between the mould closed configuration and a mould open configuration for the first and second receptacles to respectively engage the inlet and the outlet ends in the mould closed configuration and to be spaced apart therefrom in the mould open configuration.

The attachment assembly may mount the cooling plate to the stationary or the moving side of the mould (as applicable) for relative axial displacement parallel to a mould axis of the mould. The attachment assembly may include biasing means urging the cooling plate away from respective of the stationary or moving side of the mould.

The attachment assembly may include guide pins extending between the cooling plate and the respective of the stationary side and the moving side of the mould along which the cooling plate is slidable. The biasing means may be springs extending between the cooling plate and the respective of the stationary and the moving sides.

The melt transfer passage may be parallel sided to retain a plastic spigot formed by cooling of the melt therein as the mould is moved toward the mould opening configuration.

The melt transfer passage may narrow toward the melt inlet to cause a plastic spigot formed by cooling of the melt therein to stay attached to the outlet end as the mould is moved toward the mould open configuration. The melt transfer passage may alternatively narrow toward the melt outlet to cause a plastic spigot formed by cooling of the melt therein to stay attached to the inlet end as the mould is moved toward the mould open configuration.

The cooling plate may include a cooling passage extending therethrough for passage of a cooling fluid therealong to assist in removal of heat from the cooling plate.

The cooling plate may be secured to one of the first nozzle member and the second nozzle member.

DESCRIPTION OF DRAWINGS

Preferred embodiments of the present invention are described below with reference to the accompanying illustrations in which.

DESCRIPTION OF PREFERRED EMBODIMENTS

Figure 1:
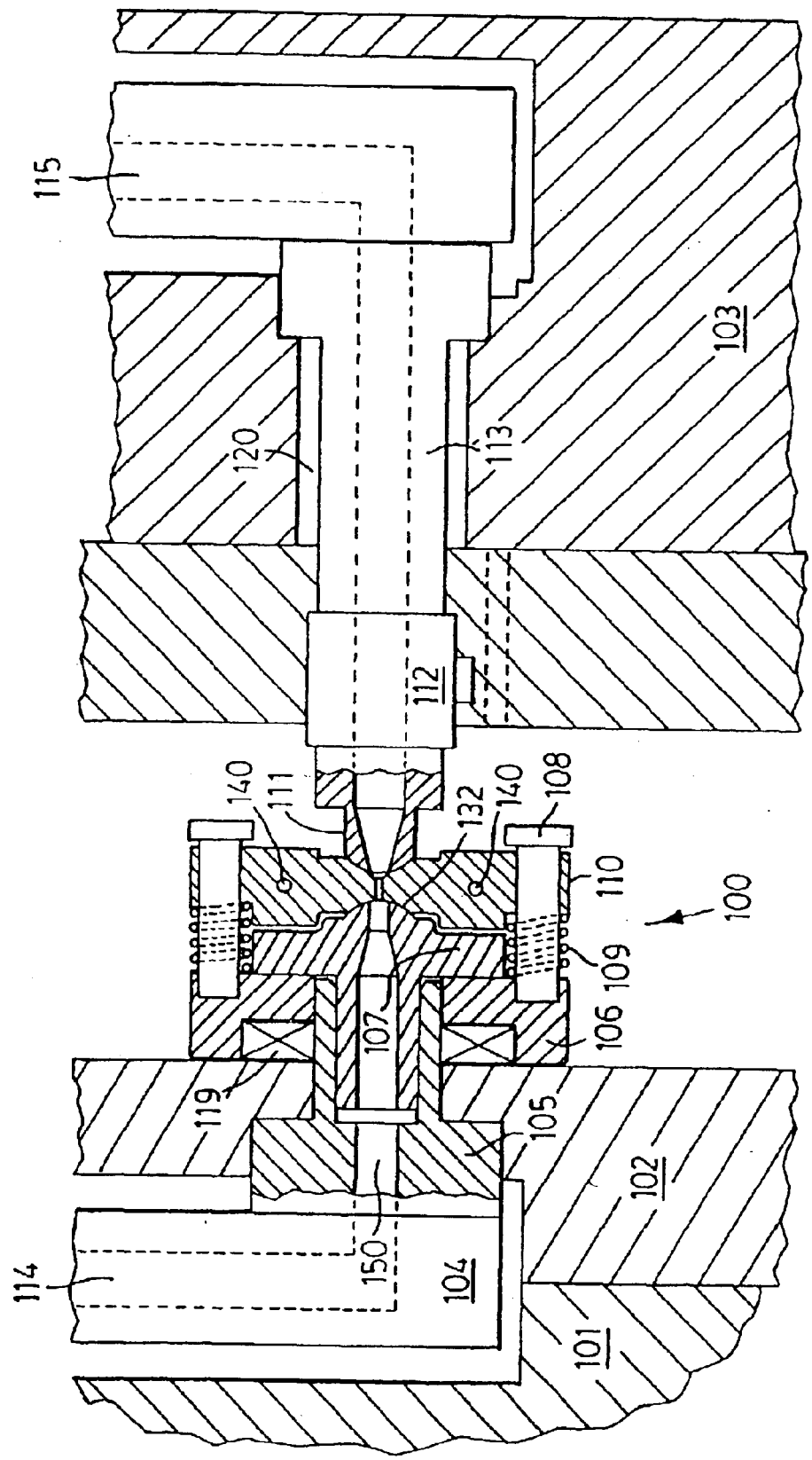
FIG. 1 is a schematic axial sectional view illustrating an anti-drool cross over nozzle arrangement according to the present invention in a mould closed configuration; and, FIG. 2 is a view corresponding to FIG. 1 but illustrating the arrangement in a mould open configuration.

An anti-drool cross over nozzle arrangement according to the present invention is generally indicated by reference 100 in the accompanying illustrations. The arrangement 100 is shown mounted between a stationary side 103 of an injection moulding apparatus (the balance of which is not shown but would be familiar to those skilled in injection moulding technology) and a moving side made up of parts 101 and 102. The moving side 101, 102 is movable parallel to a mould axis 150.

A melt channel 115 provides melt to a first nozzle member 120. The first nozzle member 120 has a nozzle housing 113 and a melt outlet end 111 with a melt outlet 122. A heater band 112 encircles the nozzle housing 113 near the outlet end 111 to provide heat (if required) to the nozzle housing to control melt viscosity at the melt outlet 112.

A second nozzle member 107 is associated with the moving side 101, 102. The second nozzle member 107 has an inlet end 132 having a melt inlet 130 for receiving melt. The melt inlet 130 fluidly communicates with a melt channel 114.

A cooling plate 110 is mounted between the first nozzle member 120 and the second nozzle member 107. The cooling plate 110 has a first receptacle 117 for registering with and receiving the outlet end 111 of the first nozzle member 120 during a mould closed stage of an injection moulding cycle as illustrated in FIG. 1. The cooling plate 110 further has a second receptacle 118 for registering with and receiving the inlet end 132 of the second nozzle member 107 during the mould closed stage as also illustrated in FIG. 1. The first and second receptacles, 117 and 118 respectively, should register with the outlet end 111 and inlet end 132 in a substantially fluid sealed manner to avoid the escape of melt therebetween.

The cooling plate 110 has a melt transfer passage 116 extending between the first and second receptacles, 117 and 118 respectively, to provide fluid communication therethrough between the melt inlet 130 and the melt outlet 122 during the mould closed stage. After melt flow is abated, in other words, once the moulds in the injection moulding machine to which the arrangement 100 is affixed are filled, the cooling plate 110 will dissipate heat from melt in the melt transfer passage 116. This will cause solidification of the melt in the melt transfer passage 116 and in the melt inlet 132 and the melt outlet 122 adjacent thereto prior to separation of the components in the mould opening stage of the injection moulding cycle. This aids in avoiding melt seepage otherwise known as "drool" and hence the description of the nozzle arrangement 100 as "anti-drool".

The cooling plate 110 is illustrated as being carried by the moving side 101, 102, however it might alternatively be carried by the stationary side 103. A cooling plate attachment assembly consisting of pins 108 and a biasing means such as the springs 109 illustrated.

Figure 2:
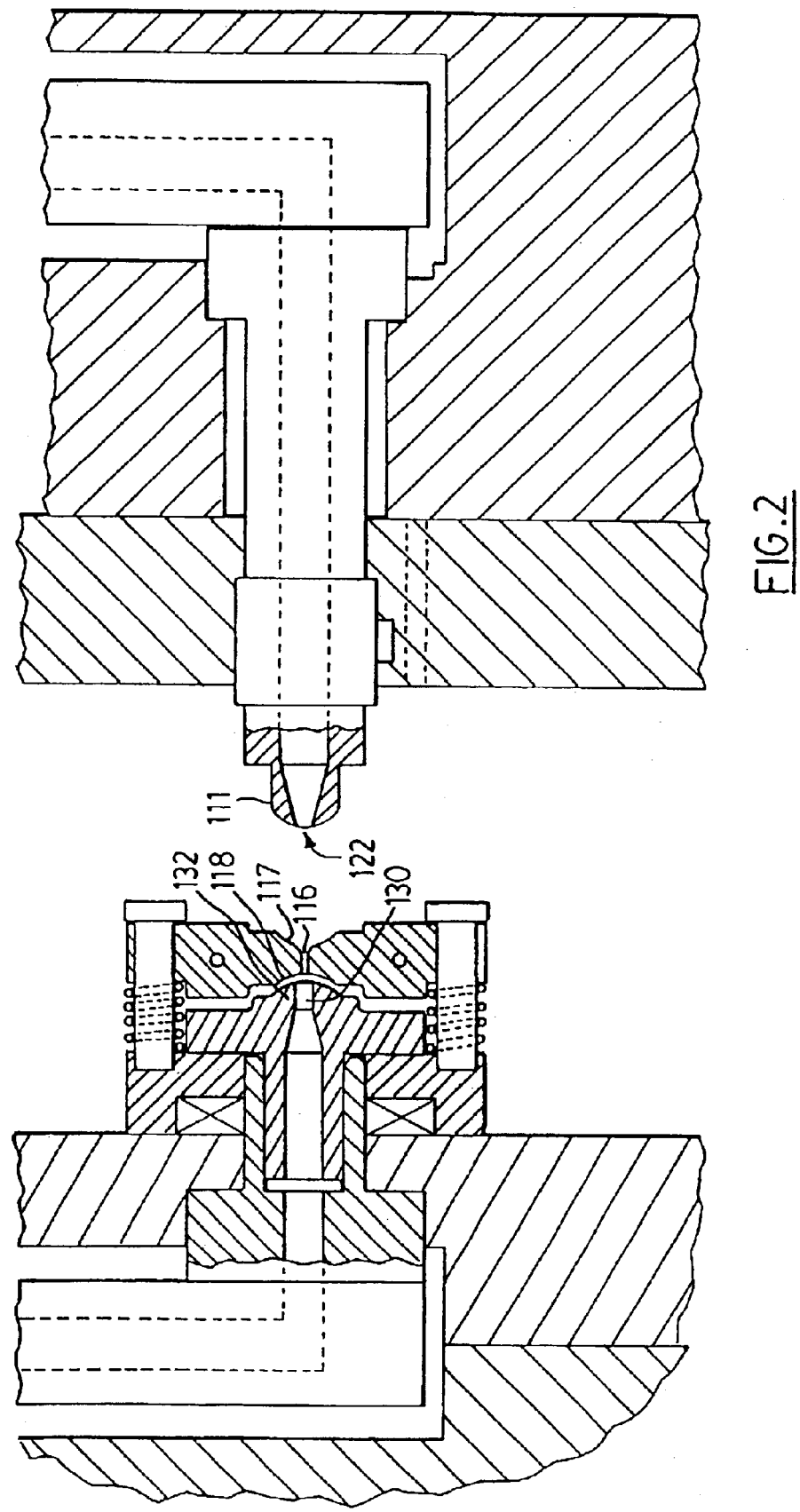

The springs 109 urge the cooling plate 110 away from the inlet end 132. Accordingly, as illustrated in FIG. 2, the cooling plate is spaced apart from the inlet end 132 as the moulding assembly incorporating the arrangement 100 is moved toward its mould open configuration. The pins 108 have heads which limit the displacement of the cooling plate 110 thereby resulting in the cooling plate 110 also being spaced apart from the outlet end 111 in the mould open configuration.

The movement of the cooling plate 110 away from both the outlet end 11 and inlet end 132 controls the amount of heat removed by the cooling plate 110. Having the cooling plate spaced apart from the inlet end 132 and the outlet end 111 ensures that the cooling plate 110 doesn't continue to "freeze off" the melt outlet 122 or the melt inlet 130.

As the moulding assembly is moved toward its mould closed configuration (in other words, as the moving side 101, 102 is moved toward the stationary side 103) the outlet end 111 urges the cooling plate 110 toward the inlet end 132 of the second nozzle member 107, against the force of the springs 109.

Although the use of springs 109 is shown in the illustrative example, other means may be devised for effecting relative movement of the cooling plate relative to the first nozzle member 120 and the second nozzle member 107. For example a mechanical linkage or screw splines might be used. Also biasing means other than springs 109 might be utilized, such as a fluid pressure responsive piston slidable along a bore which may for example be coupled to the pins 108.

Air cooling may be relied upon to dissipate heat from the cooling plate 110 in some applications. If enhanced heat dissipation is required, further cooling may be provided by a cooling passage 140 through which a coolant fluid, such as water, may be passed to aid in removal of heat.

Upon cooling and ensuing solidification of the melt in the melt transfer passage 116, a "spigot" of plastic will form therein. The melt transfer passage 116 may be configured in different ways depending on whether the spigot is to remain therein or to attach to the outlet end 111 of the first nozzle member 120 or to the inlet end 132 of the second nozzle member 130. The configuration of the melt transfer passage 116 illustrated is of generally constant diameter (i.e. "parallel sided") which will result in the spigot remaining therein. If the melt transfer passage 116 narrows toward the melt outlet 122, the spigot will tend to stay attached to the melt inlet 130. Conversely, if the melt transfer passage 116 narrows toward the melt inlet 130, the spigot will tend to stay attached to the melt outlet 122.

To further cushion the arrangement 100 during mould opening and closing, a cover plate 106 may be placed between the second nozzle member 107 and the moving side 102. Furthermore, the second nozzle member 107 may be slidably received in a socket member 105 and springs 119 mounted between the moving side 102 and the second cover plate 106 to urge the cover plate 106 and second nozzle member 107 away from the moving side 102. A manifold 104 may be provided through which the melt passage 114 extends and receives melt from the second nozzle member 130.

It will be appreciated that the amount of heat provided to and retained by the cooling plate 110 will be a significant factor in optimizing performance of an injection moulding arrangement utilizing such a feature. Accordingly nozzle design may play a significant role in system performance. It is expected that nozzles with hotter tips and greater surface area will provide more heat to the cooling plate 110 than nozzle arrangements with less surface area and lower operating temperatures.

FIGS. 3 through 7 illustrated various configurations for the first nozzle member 120 and in particular its melt outlet end 111. Similar designs may be applied to the second nozzle member 107 and its melt inlet end 132.

Figure 3:
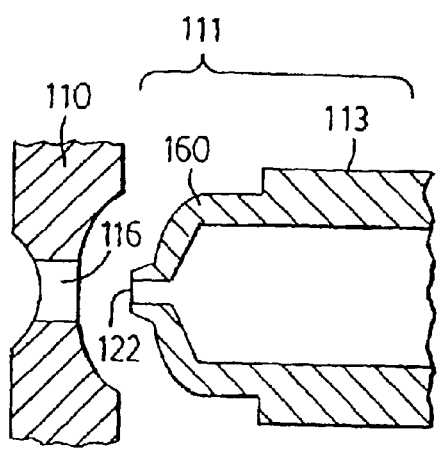
FIGS. 3 through 7 are axial cross-sectional views illustrating various nozzle tip configurations.

FIG. 3 illustrates a nozzle member 120 which is a "one piece" configuration having a melt outlet end 111 in the form of a tip 160 machined in the nozzle housing 113. This is a relatively simple configuration but not readily reconfigurable other than by remachining.

FIGS. 4 through 7 illustrate three-part nozzles in which the nozzle housing 113 receives a nozzle tip 170 and a threaded collar referred to as a "nozzle cap" 172. The nozzle cap 172 threadedly engages the nozzle housing 113 and abuts against a flange 174 extending about the base of the nozzle tip 170 to secure the nozzle tip 170 in the nozzle housing 113.

Figure 4:
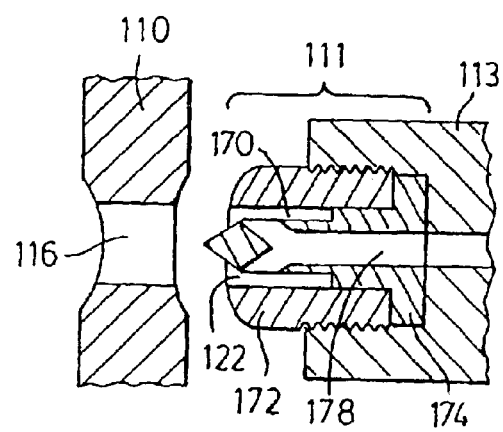

FIG. 4 illustrates an arrangement wherein the nozzle tip 170 extends from the nozzle housing 113 beyond the nozzle cap 172, wherein the melt outlet 111 has a breadth generally about the same as that of the nozzle tip 170 and wherein a nozzle tip melt passage 178 diverges radially outwardly at the melt outlet 122.

Figure 5:
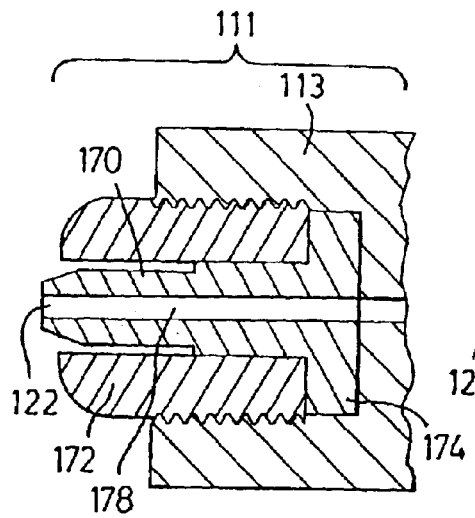

FIG. 5 illustrates an arrangement wherein the nozzle tip 170 extends beyond the nozzle cap 172 and the melt passage 178 is generally "straight through". This is referred to as a "through tip".

Figure 6:
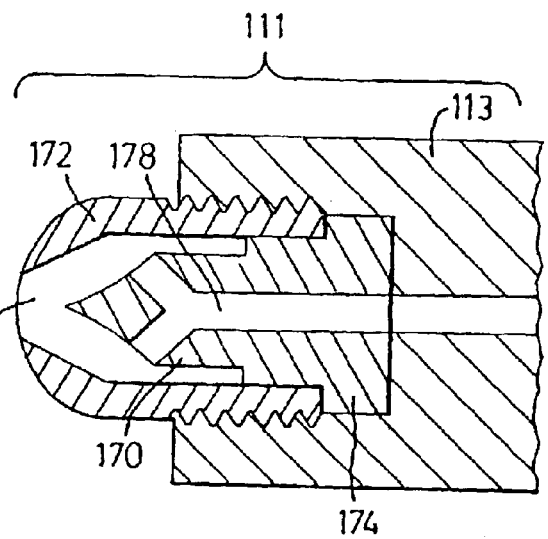

FIG. 6 illustrates an arrangement somewhat similar to that of FIG. 4 but wherein the nozzle cap 172 extends beyond the nozzle housing 170 and the melt passage 178 narrows toward the melt outlet 122.

Figure 7:
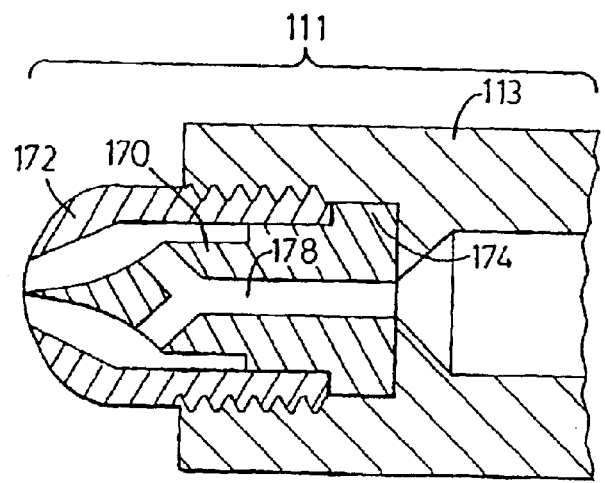

FIG. 7 illustrates an arrangement similar to that of FIG. 6 but wherein the nozzle tip 170 and nozzle housing 172 are generally coterminal. Another embodiment which is not illustrated would be similar to that of FIG. 7 but wherein the nozzle tip 170 protrudes beyond the nozzle cap 170.

The FIGS. 6 and 7 embodiments provide a greater contact area between the nozzle cap 172 and the cooling plate 110 thereby increasing heat transfer therebetween. The FIG. 4 arrangement allows the nozzle tip 170 to extend into the melt transfer passage 116 in the cooling plate 110 in the mould closed configuration.

In the FIG. 5 embodiment, melt does not impinge directly upon the nozzle cap 172 from the melt passage 178. This arrangement therefore isolates the melt outlet 122 somewhat from the effects of the cooling plate 110.

The above description is intended in an illustrative rather than a restrictive sense. Variations to the exact embodiments described may be apparent to appropriately skilled persons without departing from the spirit and scope of the invention which is defined by the claims set out below:

We claim:

1. An anti-drool cross over nozzle arrangement for a sprue gated melt transfer system comprising:

a first nozzle member having a melt outlet end with a melt outlet for discharging melt;

a second nozzle member having a melt inlet end with a molt inlet for receiving melt;

a cooling plate mounted between said first and second nozzle members, said cooling plate having a thirst and second receptacles respectively registering with and for receiving said melt outlet end and said melt inlet end during a mould closed stage of an injection moulding cycle; and said cooling plate having a melt transfer passage extending between said first and second receptacles for providing fluid communication between said melt inlet and said melt outlet during said mould closed stage.

2. The arrangement of claim 1 wherein:

said cooling plate is carried by one of a fixed side and a moving side of said mould, being attached thereto by a cooling plate attachment assembly; and said cooling plate attachment assembly reacts to movement of an injection moulding assembly incorporating said melt transfer system between said mould closed configuration and a mould open configuration for said first and second receptacles to respectively engage said inlet and said outlet ends in said mould closed configuration and to be spaced apart therefrom in said mould open configuration.

3. The arrangement of claim 2 wherein:

said attachment assembly mounts said cooling plate to a respective one of said fixed and said moving side for relative axial displacement parallel to a mould axis of said mould and includes biasing means for moving said cooling plate away from said respective one of said fixed and said moving side of said mould.

4. The arrangement of claim 3 wherein:

said attachment assembly includes guide pins extending between said cooling plate and said respective of said fixed side and said moving side of said mould along which said cooling plate is slidable; and said biasing means are springs extending between said cooling plate and said respective of said fixed side and said moving side.

5. The arrangement of claim 4 wherein:

said melt transfer passage is parallel sided to retain a plastic spigot formed by cooling of said melt therein as said mould is moved toward said mould open configuration.

6. The arrangement of claim 4 wherein:

said melt transfer passage narrows toward said melt inlet to cause a plastic spigot formed by cooling of said melt therein to stay attached to said outlet end as said mould is moved toward said mould open configuration.

7. The arrangement of claim 4 wherein:

said melt transfer passage narrows toward said melt outlet to cause a plastic spigot formed by cooling of said melt therein to stay attached to said inlet end as said mould is moved toward said mould open configuration.

8. The arrangement of claim 5 wherein:

said cooling plate includes a cooling passage extending therethrough for passage of a coolant fluid therealong to assist in removal of heat from said cooling plate.

9. The arrangement of claim 5 wherein:

said cooling plate is secured to one of said first nozzle member and said second nozzle member.

10. The arrangement of claim 8 wherein:

said cooling plate is secured to one of said first nozzle member and said second nozzle member.

\* \* \* \* \*

UNITED STATES PATENT AND TRADEMARK OFFICE
CERTIFICATE OF CORRECTION

PATENT NO. : 6,910,877 B2
DATED : June 28, 2005
INVENTOR(S) : Mihai Berceanu

It is certified that error appears in the above-identified patent and that said Letters Patent is hereby corrected as shown below:

Column 5,
Line 64, delete "molt" and replace with -- melt --;
Line 66, delete "a thirst" and replace with -- first --.

Signed and Sealed this

Fourth Day of October, 2005

JON W. DUDAS
*Director of the United States Patent and Trademark Office*